(12) United States Patent
Webb

(10) Patent No.: US 11,752,645 B2
(45) Date of Patent: Sep. 12, 2023

(54) NON-PLANAR LINEAR ACTUATOR

(71) Applicant: Boston Dynamics, Inc., Waltham, MA (US)

(72) Inventor: Jacob Daniel Webb, Cambridge, MA (US)

(73) Assignee: Boston Dynamics, Inc., Waltham, MA (US)

( * ) Notice: Subject to any disclaimer, the term of this patent is extended or adjusted under 35 U.S.C. 154(b) by 653 days.

(21) Appl. No.: 16/790,320

(22) Filed: Feb. 13, 2020

(65) Prior Publication Data
US 2021/0252697 A1 Aug. 19, 2021

(51) Int. Cl.
*F16H 25/20* (2006.01)
*B25J 9/10* (2006.01)
*B25J 17/00* (2006.01)
*F16H 37/12* (2006.01)

(52) U.S. Cl.
CPC ............... *B25J 9/102* (2013.01); *B25J 17/00* (2013.01); *F16H 25/20* (2013.01); *F16H 37/12* (2013.01); *F16H 2025/2075* (2013.01)

(58) Field of Classification Search
CPC . B25J 9/0051; B25J 9/102; B25J 9/106; B25J 9/108; B25J 9/123; B25J 17/00; B25J 17/0241; F16H 25/20; F16H 25/2025; F16H 25/204; F16H 2025/301; F16H 37/12; F16C 23/043; F16C 23/045; F16C 23/082; F16C 23/084
See application file for complete search history.

(56) References Cited

U.S. PATENT DOCUMENTS

| 5,941,128 | A  | * | 8/1999 | Toyama ............... B25J 17/0208 |
|           |    |   |        | 901/29                             |
| 9,303,742 | B2 | * | 4/2016 | Schroeder ........... F16H 25/2006 |
| 9,687,377 | B2 | * | 6/2017 | Han ..................... A61F 5/0125 |

(Continued)

FOREIGN PATENT DOCUMENTS

| CN | 108791563 A | 11/2018 |
| EP | 3385571 A1 | 10/2018 |
| WO | 2019173751 A1 | 9/2019 |

OTHER PUBLICATIONS

EIC 3600 Search Report (Year: 2023).*
International Search Report, Application No. PCT/US2021/015075, dated May 14, 2021, 16 pages.

*Primary Examiner* — Bobby Rushing, Jr.
(74) *Attorney, Agent, or Firm* — Knobbe Martens Olson & Bear LLP

(57) ABSTRACT

A drive system includes a linear actuator with a drive shaft and having an actuation axis extending along a length of the linear actuator. A motor assembly of the drive system couples to drive shaft and is configured to rotate the drive shaft about the actuation axis of the linear actuator. The drive system further includes a nut attached to the drive shaft and a carrier housing the nut. A linkage system of the drive system extends from a proximal end away from the motor assembly to a distal end. The proximal end of the linkage system rotatably attaches to the carrier at a first proximal attachment location where the first proximal attachment location offset is from the actuation axis. The drive system also includes an output link rotatably coupled to the distal end of the linkage system where the output link is offset from the actuation axis.

24 Claims, 8 Drawing Sheets

(56) References Cited

U.S. PATENT DOCUMENTS

| | | | |
|---|---|---|---|
| 10,253,855 B2* | 4/2019 | Potter | F16H 25/20 |
| 2010/0263471 A1* | 10/2010 | Weber | B25J 9/0051 |
| | | | 74/490.06 |
| 2014/0298934 A1* | 10/2014 | Marek | F16H 25/20 |
| | | | 74/89.33 |
| 2015/0176754 A1* | 6/2015 | Houston | B25J 9/0009 |
| | | | 248/125.1 |
| 2016/0288320 A1 | 10/2016 | Wanner et al. | |
| 2018/0116828 A1 | 5/2018 | Quinn et al. | |
| 2020/0147783 A1* | 5/2020 | Crawford | B25J 9/102 |

\* cited by examiner

NON-PLANAR LINEAR ACTUATOR

TECHNICAL FIELD

This disclosure relates to linear actuators.

BACKGROUND

A robot is generally defined as a reprogrammable and multifunctional manipulator designed to move material, parts, tools, or specialized devices through variable programmed motions for a performance of tasks. Robots may be manipulators that are physically anchored (e.g., industrial robotic arms), mobile robots that move throughout an environment (e.g., using legs, wheels, or traction based mechanisms), or some combination of a manipulator and a mobile robot. Robots are utilized in a variety of industries including, for example, manufacturing, transportation, hazardous environments, exploration, and healthcare. As such, the ability of robots to traverse environments with obstacles or features requiring various means of coordinated leg movement provides additional benefits to such industries.

SUMMARY

One aspect of the disclosure provides a drive system. The drive system includes a linear actuator including a drive shaft and having an actuation axis extending along a length of the linear actuator. The drive system also includes a motor assembly coupled to drive shaft of the linear actuator and configured to rotate the drive shaft about the actuation axis of the linear actuator. The drive system further includes a nut attached to the drive shaft and a carrier housing the nut. A linkage system of the drive system extends from a proximal end away from the motor assembly to a distal end. The proximal end of the linkage system rotatably attaches to the carrier at a first proximal attachment location where the first proximal attachment location offset is from the actuation axis. The drive system also includes an output link rotatably coupled to the distal end of the linkage system where the output link is offset from the actuation axis.

Implementations of the disclosure may include one or more of the following optional features. In some implementations, the linkage system includes a proximal spherical bearing disposed at the proximal end of the linkage system that defines a first axis of rotation orthogonal to the actuation axis and a distal spherical bearing disposed at the distal end of the linkage system that defines a second axis of rotation orthogonal to the actuation axis. Here, the proximal spherical bearing rotatably attaches the linkage system to the carrier at the first proximal attachment location and the distal spherical bearing rotatably couples the output link to the distal end of the linkage system at a first distal attachment location where the first distal attachment location offset from the actuation axis. In these implementations, the first axis of rotation and the second axis of rotation are parallel to one another in a first position of the drive system and, in a second position of the drive system, the first axis of rotation and the second axis of rotation are non-parallel to one another. In some examples, a line bisecting the first proximal attachment location and the first distal attachment location converges toward the actuation axis in a direction extending from the first proximal attachment location to the first distal attachment location.

In some configurations, the linkage system further includes (i) a first connecting rod having a first proximal end disposed at the proximal end of the linkage system and a first distal end disposed at the distal end of the linkage system and (ii) a second connecting rod having a second proximal end disposed at the proximal end of the linkage system and a second distal end disposed at the distal end of the linkage system. Here, the first proximal end rotatably attaches to the carrier at the first proximal attachment location and the second proximal end rotatably attaches to the carrier at a second proximal attachment location where the second attachment location is offset from the actuation axis. The first proximal attachment location and the second proximal attachment location may be disposed on opposite sides of the actuation axis and equidistantly offset from the actuation axis. In these configurations, the linkage system may further include (i) a first proximal spherical bearing disposed at the first proximal end of the first connecting rod and defining a first axis of rotation orthogonal to the actuation axis and (ii) a second proximal spherical bearing disposed at the second proximal end of the second connecting rod and defining a second axis of rotation orthogonal to the actuation axis and coaxial with the first axis of rotation. Here, the first proximal spherical bearing rotatably attaches the first connecting rod to the carrier at the first proximal attachment location and the second proximal spherical bearing rotatably attaches the second connecting rod to the carrier at the second proximal attachment location.

Additionally or alternatively, in these configurations, the linkage system may further include (i) a first distal spherical bearing disposed at the first distal end of the first connecting rod and defining a first axis of rotation orthogonal to the actuation axis and (ii) a second distal spherical bearing disposed at the second distal end of the second connecting rod and defining a second axis of rotation orthogonal to the actuation axis and coaxial with the second axis of rotation. In this arrangement, the first distal spherical bearing rotatably couples the output link to the first distal end of the first connecting rod at a first distal attachment location where the first distal attachment location is offset from the actuation axis and the second distal spherical bearing rotatably couples the output link to the second distal end of the second connecting rod at a second distal attachment location where the second distal attachment location offset from the actuation axis. The first distal attachment location and the second distal attachment location may be disposed on opposite sides of the actuation axis and equidistantly offset from the actuation axis. The output link may include an output spherical bearing disposed between the first spherical bearing and the second distal spherical bearing where the output spherical bearing defines a third axis of rotation coaxial with the first axis of rotation and the second axis of rotation.

In some implementations, the first connecting rod defines a longitudinal axis that converges toward the actuation axis in a direction extending from the first proximal end of the first connecting rod to the first distal end of the first connecting rod and the second connecting rod defines a longitudinal axis that converges toward the actuation axis in a direction extending from the second proximal end of the second connecting rod to the second distal end of the second connecting rod.

Optionally, the carrier includes a first mounting shaft that extends away from an outer surface of the carrier in a first direction and a second mounting shaft that extends away from the outer surface of the carrier in a second direction opposite the first direction. Here, the first mounting shaft defines the first proximal attachment location while the second mounting shaft defines the second proximal attachment location. A longitudinal axis of the first mounting shaft and a longitudinal axis of the second mounting shaft may be coincident with one another and orthogonal to the actuation axis.

In some implementations, the drive system also includes a frame disposed on the motor assembly. The frame at least partially surrounds the carrier and extends from the motor assembly to an end of the drive shaft. The frame may include at least one guide rail extending along a length of the frame where the at least one guide rail guides the carrier along the actuation axis of the drive shaft and constrains rotation of the carrier about the actuation axis. In some of these implementations, the frame includes a first guide rail and a second guide rail. Here, the first guide rail and the second guide rail extends along a length of the frame and includes opposing faces. The carrier may include a protrusion seated between the opposing faces of the first guide rail and the second guide rail.

Another aspect of the disclosure provides a leg of a robot with a drive system. The robot includes a leg with an upper member and a lower member where the upper member is coupled to the lower member at a pivot point of a knee joint of the leg. The robot also includes a drive system within a cavity of the upper member where the drive system is configured to rotate the lower member of the leg about the pivot point of the knee joint. The drive system includes a motor assembly, a linear actuator, a carrier, and a linkage system. The linear actuator is coupled to the motor assembly and extends along an axis of the upper member. The carrier is disposed on the linear actuator. The linkage system includes at least one connecting rod where the at least one connecting rod has a first end and a second end. The first end connects to the carrier with a first spherical bearing and the second end connects to the lower member at a position offset from the pivot point of the knee joint with a second spherical bearing. The second spherical bearing of the at least one connecting rods is coaxially joined to a third spherical bearing embedded into the lower member at the knee joint. The carrier is configured to translate motion of the linear actuator to the linkage system causing the lower member of the leg to pivot about the pivot point of the knee joint.

This aspect may include one or more of the following optional features. In some examples, the carrier further includes a first cylinder rod and a second cylinder rod. Here, the first cylinder rod and the second cylinder rod extend toward an inner wall of the upper member. The first cylinder rod and the second cylinder rod may be coaxial along an axis that intersects the axis of the upper member.

In some implementations, the drive system also includes a frame extending along the axis of the upper member where the frame at least partially encloses the linear actuator and the carrier. The frame may constrain the carrier to translate along the axis of the upper member. In these implementations, the frame may constrain the carrier from rotating about the axis and the frame may guide the carrier to translate along the axis of the upper member. For instance, the carrier includes a protrusion that is constrained by portions of the frame. In some examples, the frame is offset from inner walls of the upper member. In some configurations, the carrier encloses a nut configured to translate along a screw shaft of the linear actuator.

Another aspect of the disclosure provides a method for reducing a force from applying a torque on a drive system. The method includes receiving a force at a knee joint of a leg of a robot. The leg of the robot includes a first bearing assembly and a second bearing assembly. The first bearing assembly is integrated with a lower member of the leg at the knee joint offset from a pivot point of the knee joint and the first bearing assembly includes a first set of spherical bearings. The second bearing assembly is located within a cavity of an upper member of the leg and is rotatably coupled to the first bearing assembly by a linkage system. The second bearing assembly rotatably couples to a carrier by the linkage system at a carrier end of the linkage system opposite a knee joint end of the linkage system. The carrier is disposed on a linear actuator housed within the upper member. The second bearing assembly includes a second set of spherical bearings. The carrier is configured to translate motion of the linear actuator to the linkage system causing the lower member of the leg to pivot about the pivot point of the knee joint. The method also includes transferring the force to at least one of the upper member of the leg or the lower member of the leg to reduce the force from applying a torque on the linear actuator. The transferred force causes at least one of (i) rotation of the first set of spherical bearings at the knee joint end of the linkage system or (ii) rotation of the second set of spherical bearings at the carrier end of the linkage system.

In some examples, the method also includes receiving the force and transferring the force while a control system of the robot performs a gait pattern for the leg of the robot. In some implementations, the linkage system includes a first connecting rod and a second connecting rod where the first connecting rod is couple to a first spherical bearing of the first set of spherical bearings at the carrier end of the first connecting rod and the second connecting rod is coupled to a second spherical bearing of the first set of spherical bearings at the carrier end of the second connecting rod. The first spherical bearing and the second spherical bearing may coaxially attach to the carrier. When the bearings coaxially attach to the carrier, the carrier may include a first cylindrical rod and a second cylindrical rod. Each cylindrical rod extends toward an inner wall of the upper member. The first cylindrical rod and the second cylindrical rod coaxially also receive the first spherical bearing and the second spherical bearing. In some configurations, the first set of spherical bearings are concentrically pinned together at the knee joint end of the linkage system.

Optionally, the carrier is partially surrounded by a frame. The frame may be disposed on a motor assembly within the upper member of the leg that drives the linear actuator. The frame may extend from the motor assembly to an end of the linear actuator. The frame may include at least one guide rail extending along a length of the frame where the at least one guide rail guides the carrier along an actuation axis of the linear actuator and constrains rotation of the carrier about the actuation axis. In some examples, the frame includes a first guide rail and a second guide rail. The first guide rail and the second guide rail extend along a length of the frame and include opposing faces. Here, the carrier may include a protrusion seated between the opposing faces of the first guide rail and the second guide rail.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
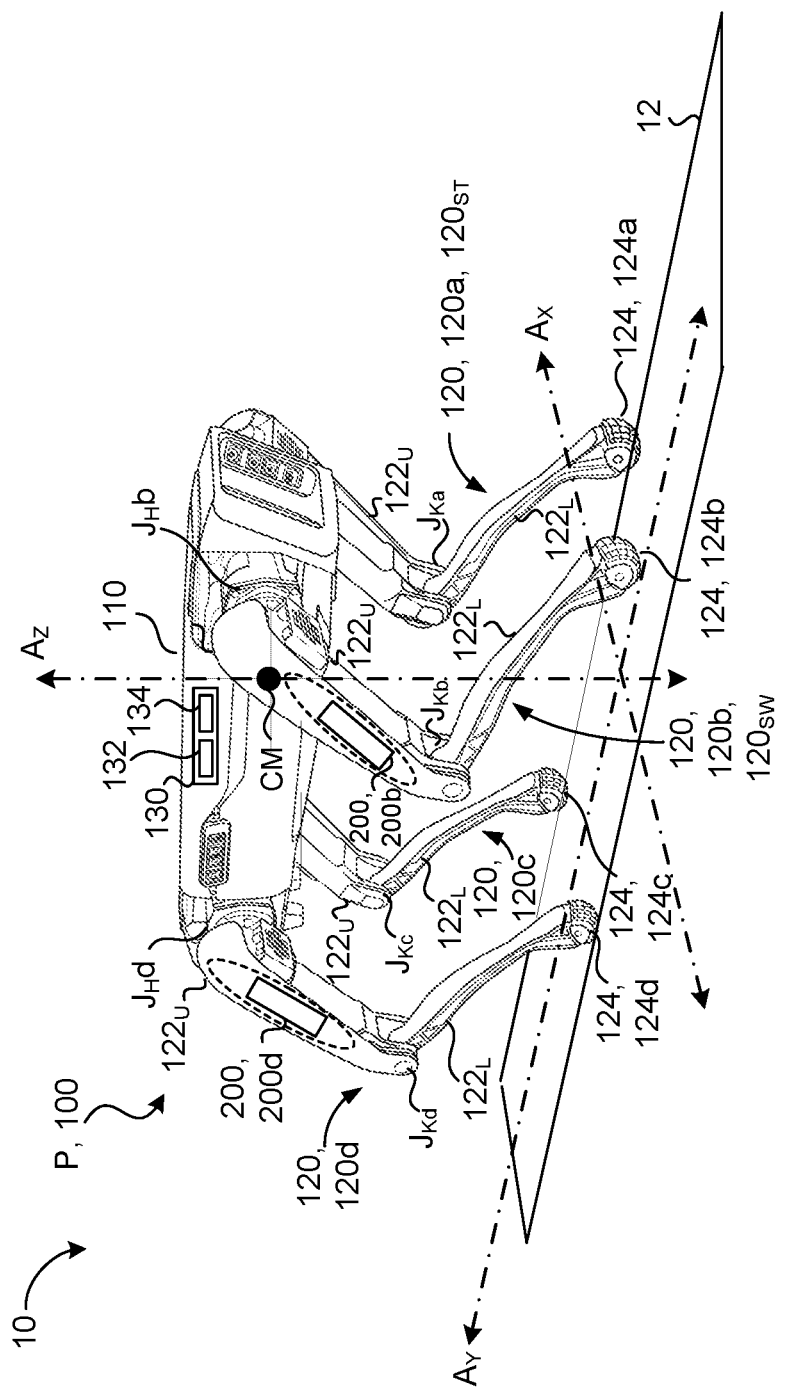
FIG. 1 is a schematic view of an example robot within an environment.

Mobile robots are generally configured to move about an environment. For instance, a robot is programmed to perform one or more tasks within the environment. To perform a given task, the robot may need to move from one location to another. As such, a robot includes locomotive structure(s) (e.g., wheels, legs, etc.) that move the robot in a particular direction or along a given path. More specifically, a robot moves using a drive system coupled to one or more of these locomotive structures. For example, the robot receives a command that requires movement and operates the drive system to move the robot accordingly. When the drive system operates a locomotive structure, a portion of the locomotive structure may contact a surface (e.g., a ground surface) providing traction to propel the robot in a desired direction.

Since a robot may be used in a wide range of environments, a robot strives to have a design that accounts for conditions within these environments. During operation in an environment, the robot may encounter various forces from its interaction with the environment. For instance, whether the robot is moving or stationary, objects within the environment may impart forces on the robot. These forces may be transferred to one or more components of the robot and, simultaneously or over time, affect the performance of the robot. In other words, these forces may cause wear and tear on the robot's components. For instance, a locomotive structure, such as a leg, may experience a collision with an object within the environment or the robot itself. Due to the collision, a force may be transferred from the locomotive structure (e.g., leg) to the drive system. When the drive system experiences a significant force or repeated forces over a period of time, the drive system may degrade. Such degradation may result in downtime for repair of the robot or potentially a reduction in performance by the robot. Either result impacts the effectiveness of the robot.

In the case of a legged robot, the drive system may be enclosed within a portion of the leg. For instance, an upper member of the leg resembling a thigh houses the drive system. Here, the drive system may transfer rotational motion from a motor assembly to linear motion along the upper member in order to pivot a lower member of the leg. By pivoting a lower member of the leg, the leg of the robot may perform a gait pattern transitioning the leg from stance to swing and vice versa. With this type of drive system, the drive system may be susceptible to damage when the leg (e.g., the lower member of the leg) experiences a force (e.g., external force). For example, a force on the lower member or at a joint coupling the upper member to the lower member (e.g., a knee joint) may reverberate back through the upper member of the leg and impact components of the drive system.

Unfortunately, when the drive system is a rigid structure, portions of the upper member may act as a lever arm that translates a force at the leg over the distance of the lever arm into a greater magnitude of torque. Therefore, in a rigid structure, the drive system may include a number of components with particularly high tolerances and precision to prevent bending, breaking, or other problematic conditions (e.g., backlash or torsion) under load from a motor assembly and/or external forces. The inclusion of such components increases the cost of construction for the leg, while also likely increasing the cost of repair due to complexity. In other words, even with high tolerance components that intend to constrain the drive system and aim to reduce the system from experiencing potentially problematic or catastrophic loads, forces on the leg may inevitably lead to repair or to replace parts of the drive system. When the leg houses the drive system, repairing the drive system may be more labor intensive, especially if the internal structure of the drive system is further encased within the leg and/or includes high tolerance components in a precise arrangement. For instance, a linear actuator of the drive system that is fully or substantially enclosed within a carriage, carrier, sleeve, or tube with linear rollers may be difficult to service due to precise tolerances. To overcome such issues, the drive assembly disclosed herein aims to provide a flexible solution to dissipate the energy and/or force(s) generated by external influences on the drive system and/or by operation of the drive system. In other words, a non-rigid drive system may reduce stress on the drive system for locomotive structures of the robot.

Referring to FIG. 1, the robot 100 includes a body 110 with locomotion based structures such as legs 120, 120a—d coupled to the body 110 that enable the robot 100 to move about the environment 10. In some examples, each leg 120 is an articulable structure such that one or more joints J permit members 122 of the leg 120 to move. For instance, each leg 120 includes a hip joint $J_H$ coupling an upper member 122, $122_U$ of the leg 120 to the body 110 and a knee joint $J_K$ coupling the upper member $122_U$ of the leg 120 to a lower member $122_L$ of the leg 120. Although FIG. 1 depicts a quadruped robot with four legs 120a-d, the robot 100 may include any number of legs or locomotive based structures (e.g., a biped or humanoid robot with two legs) that provide a means to traverse the terrain within the environment 10. As discussed in greater detail below with reference to FIGS. 2A-2E, each leg 120a—d also includes a respective drive system 200, 200a—d for imparting motion of the lower member $122_L$ of the leg relative to the upper member $122_U$.

In order to traverse the terrain, each leg 120 has a distal end 124 that contacts a surface of the terrain (i.e., a traction surface). In other words, the distal end 124 of the leg 120 is the end of the leg 120 used by the robot 100 to pivot, plant, or generally provide traction during movement of the robot 100. For example, the distal end 124 of a leg 120 corresponds to a foot of the robot 100. In some examples, though not shown, the distal end 124 of the leg 120 includes an ankle joint JA such that the distal end 124 is articulable with respect to the lower member $122_L$ of the leg 120.

The robot 100 has a vertical gravitational axis (e.g., shown as a Z-direction axis $A_Z$) along a direction of gravity, and a center of mass CM, which is a point where the weighted relative position of the distributed mass of the robot 100 sums to zero. The robot 100 further has a pose P based on the CM relative to the vertical gravitational axis $A_Z$ (i.e., the fixed reference frame with respect to gravity) to define a particular attitude or stance assumed by the robot 100. The attitude of the robot 100 can be defined by an orientation or an angular position of the robot 100 in space. Movement by the legs 120 relative to the body 110 alters the pose P of the robot 100 (i.e., the combination of the position of the CM of the robot and the attitude or orientation of the robot 100). Here, a height generally refers to a distance along the z-direction. The sagittal plane of the robot 100 corresponds to the Y-Z plane extending in directions of a y-direction axis $A_Y$ and the z-direction axis $A_Z$. In other words, the sagittal plane bisects the robot 100 into a left and right side. Generally perpendicular to the sagittal plane, a ground plane (also referred to as a transverse plane) spans the X-Y plane by extending in directions of the x-direction axis $A_X$ and the y-direction axis $A_Y$. The ground plane refers to a ground surface 12 where distal ends 124 of the legs 120 of the robot 100 may generate traction to help the robot 100 move about the environment 10. Another anatomical plane of the robot 100 is the frontal plane that extends across the body 110 of the robot 100 (e.g., from a left side of the robot 100 with a first leg 120a to a right side of the robot 100 with a second leg 120b). The frontal plane spans the X-Z plane by extending in directions of the x-direction axis $A_X$ and the z-direction axis $A_Z$.

When a legged-robot moves about the environment 10, the legs 120 of the robot undergo a gait cycle. Generally, a gait cycle begins when a leg 120 touches down or contacts a ground surface 12 and ends when that same leg 120 once again contacts the ground surface 12. The gait cycle may predominantly be divided into two phases, a swing phase and a stance phase. During the swing phase, a leg 120 performs (i) lift-off from the ground surface 12 (also sometimes referred to as toe-off and the transition between the stance phase and swing phase), (ii) flexion at a knee joint $J_K$ of the leg 120, (iii) extension of the knee joint $J_K$ of the leg 120, and (iv) touchdown back to the ground surface 12. Here, a leg 120 in the swing phase is referred to as a swing leg $120_{SW}$. As the swing leg $120_{SW}$ proceeds through the movement of the swing phase $120_{SW}$, another leg 120 performs the stance phase. The stance phase refers to a period of time where a distal end 124 (e.g., a foot) of the leg 120 is on the ground surface 12. During the stance phase a leg 120 performs (i) initial ground surface contact which triggers a transition from the swing phase to the stance phase, (ii) loading response where the leg 120 dampens ground surface contact, (iii) mid-stance support for when the contralateral leg (i.e., the swing leg $120_{SW}$) lifts-off and swings to a balanced position (about halfway through the swing phase), and (iv) terminal-stance support from when the robot's COM is over the leg 120 until the contralateral leg 120 touches down to the ground surface 12. Here, a leg 120 in the stance phase is referred to as a stance leg $120_{ST}$.

In order to perform tasks within the environment 10, the robot 100 includes a computing system 130 of the robot 100 with data processing hardware 132 and memory hardware 134. The data processing hardware 132 is configured to execute instructions stored in the memory hardware 134 to perform computing tasks related to activities (e.g., movement and/or movement based activities) for the robot 100. Generally speaking, the computing system 130 refers to one or more locations of data processing hardware 132 and/or memory hardware 134. With the computing system 130, the robot 100 may receive movement or task-based commands (e.g., from a remote control) or operate within the environment 10 autonomously (e.g., using a sensor/perception system).

In some examples, the computing system 130 is a local system located on the robot 100. When located on the robot 100, the computing system 130 may be centralized (i.e., in a single location/area on the robot 100, for example, the body 110 of the robot 100), decentralized (i.e., located at various locations about the robot 100), or a hybrid combination of both (e.g., where a majority of centralized hardware and a minority of decentralized hardware). To illustrate some differences, a decentralized computing system 130 may allow processing to occur at an activity location (e.g., at motor that moves a joint of a leg 120) while a centralized computing system 130 may allow for a central processing hub that communicates to systems located at various positions on the robot 100 (e.g., communicate to the motor that moves the joint of the leg 120).

Additionally or alternatively, the computing system 130 includes computing resources that are located remotely from the robot 100. For instance, the computing system 130 communicates via a network with a remote system (e.g., a remote server or a cloud-based environment). Much like the computing system 130, the remote system (not shown) includes remote computing resources such as remote data processing hardware and remote memory hardware. Here, data (e.g., sensor data) may be stored and/or processed in the remote system, yet accessible to the computing system 130. In some examples, the computing system 130 is configured to utilize the remote resources as extensions of the computing resources 132, 134 such that resources of the computing system 130 may reside on resources of the remote system.

Referring to FIGS. 2A-2E, one or more legs 120 of the robot 100 include a drive system 200. The drive system 200 is configured to transfer motion from a motor assembly 210 to an output link 202 for moving the lower member $122_L$ of the leg 120 relative to the upper member $122_U$ of the leg 120. For example, with respect to a legged robot 100, the drive system 200 transfers motion from the motor assembly 210 to an output link 202 coupled to (e.g., integrated with) the lower member $122_L$ of the leg 120. Here, the motor assembly 210 is part of the drive system 200 such that the motor assembly 210 may be the initial source of motion that the remainder of the drive system 200 transfers to the output link 202. For instance, when the motor assembly 210 is predominantly electric, control circuitry of the motor assembly 210 controls electrical signals that rotate an output shaft of the motor assembly 210. The control circuitry may be part of the computing system 130 or a separate control system that communicates with the computing system 130.

Figure 2A:
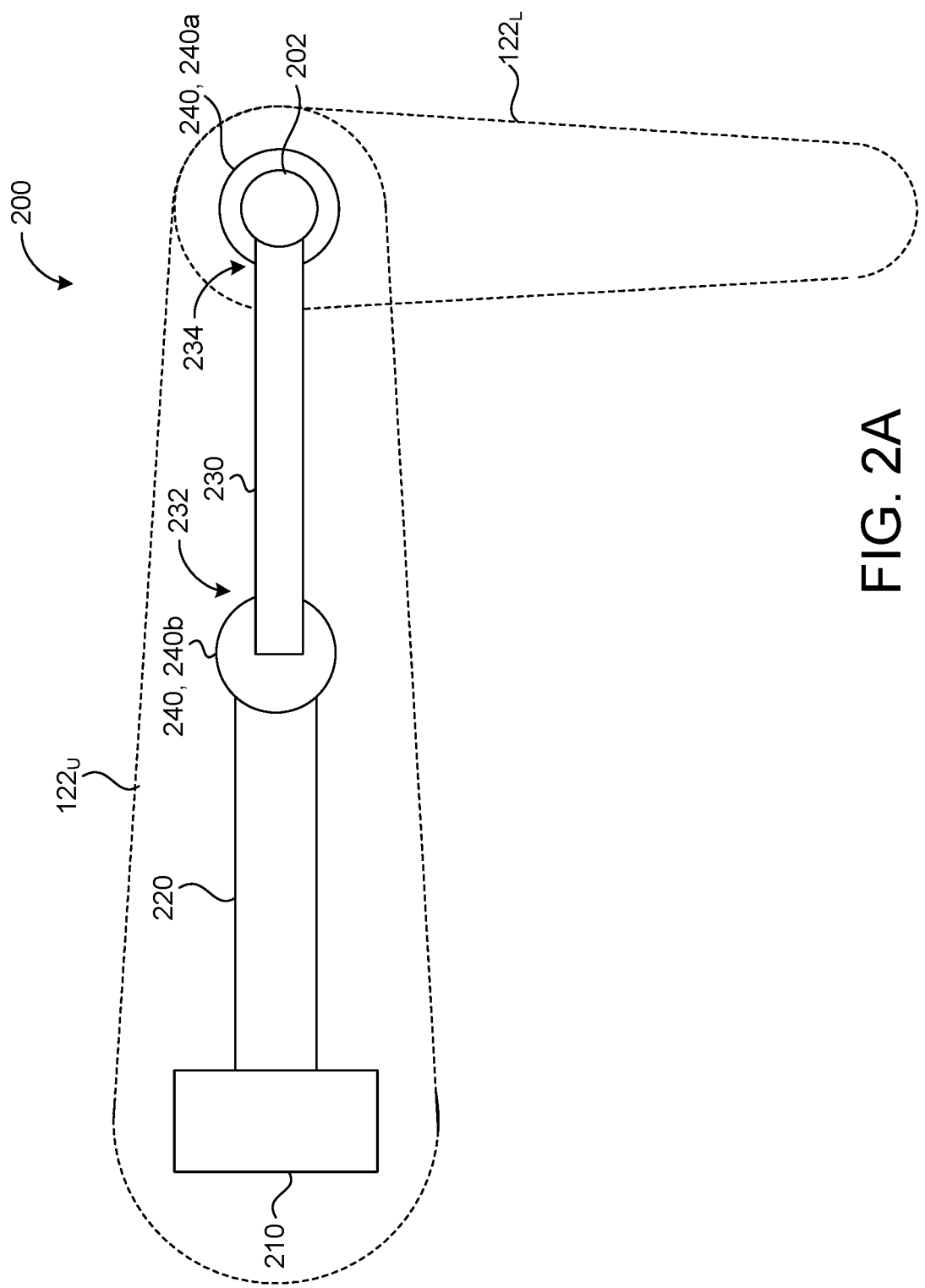
FIG. 2A is a block diagram of an example drive system.

As shown in FIG. 2A, the motor assembly 210 is coupled to an actuator 220 (e.g., a linear actuator). The coupling of the motor assembly 210 to a linear actuator 220 translates the rotary motion generated by the motor assembly 210 into generally linear motion. For example, a linear actuator 220 includes a shaft 222 (FIG. 2B), such as a screw shaft (e.g., also referred to as a lead screw or a spindle), that rotates about an axis $A_L$ (e.g., also referred to as an actuation axis) (FIG. 2C) of the linear actuator 220 where the axis $A_L$ extends along a length of the linear actuator 220. In other words, as the motor assembly 210 generates rotary motion, the linear actuator 220 (e.g., the shaft 222) rotates either clockwise or counterclockwise.

In some implementations, a linkage system 230 is coupled to the linear actuator 220 to transfer the motion of the linear actuator 220 (e.g., the clockwise or the counterclockwise rotation of the linear actuator 220) into generally linear motion. For example, the linkage system 230 extends and retracts as the linear actuator 220 rotates (e.g., the shaft 222 rotates). In some examples, the linkage system 230 functions as a means to extend a length of the drive system 200. This extension may be advantageous to limit a size of the linear actuator 220 (e.g., a length of the linear actuator 220) or to reduce a risk of flexion or damage of the shaft 222 of the linear actuator 220 over its length. In some configurations, the linkage system 230 is rotatably coupled to the linear actuator 220. For instance, a proximal end 232 of the linkage system 230 rotatably couples to the linear actuator 220 at a proximal attachment location. Here, the proximal end 232 of the linkage system 230 refers to an end of the linkage system 230 closest to the motor assembly 210 while a distal end 234 of the linkage system 230 refers to an end of the linkage system 230 opposite the proximal end 232 or furthest away from the motor assembly 210 (e.g., shown as coupled to the output link 202).

In some implementations, a bearing assembly 240 (e.g., shown as bearing assembly 240, 240b) rotatably couples the proximal end 232 of the linkage system 230 to the linear actuator 220 at a proximal attachment location, $L_p$. For instance, a bearing assembly 240 includes one or more spherical bearings 242 (FIG. 2B) configured to allow angular rotation of the bearing 242 about a central point. By coupling the linear actuator 220 to the linkage system 230 with a spherical bearing 242, stress on the linkage system 230 from an external force on the leg 120 may be absorbed by the external structure of the upper member $122_U$ and/or the lower member $122_L$ of the leg 120. In other words, rotation of the bearing assembly 240 (e.g., one or more spherical bearings 242) allows the external force to be redirected to the structural frame (e.g., walls) of the leg 120. For example, the bearing assembly 240 allows the external force to be converted into spring-like energy at the external portion of the leg 120 instead of a load (e.g., a torsion load) at an internal portion of the leg 120 (e.g., at the linear actuator 220 of the drive system 200). With this transfer of energy, the bearing assembly 240 may reduce or prevent forces from being directly transferred to the linear actuator 220 and causing potential damage or degradation to the drive system 200. For instance, the external structure of the leg 120 may bend instead without causing the internal structure of the linear actuator 220 to bend or receive problematic torsion loads (e.g., at the nut 224). In some configurations, such as FIGS. 2B-2E, the bearing assembly 240 includes multiple spherical bearings 242 (e.g., spherical bearings 242, 242a-b). For instance, at each location (e.g., first and second attachment locations) where the linkage system 230 connects or couples to the linear actuator 220, the linkage system 230 connects to the linear actuator 220 with a spherical bearing 242. Here, a first proximal spherical bearing 242a, associated with a first proximal attachment location, and a second proximal spherical bearing 242b, associated with a second proximal attachment location, are disposed on opposite sides of the actuation axis $A_L$ and equidistantly offset from the actuation axis $A_L$.

With continued reference to FIGS. 2A-2E, the distal end 234 of the linkage system 230 couples to the output link 202 at a distal attachment location, $L_d$. For instance, the distal end 234 of the linkage system 230 is rotatably coupled to the output link 202. Here, much like the proximal end 232 of the linkage system 230, the distal end 234 may rotatably couple to the output link 202 using a bearing assembly 240 (e.g., a second bearing assembly 240, 240b). By rotatably coupling the linkage system 230 to the output link 202 via one or more spherical bearings 242, 242c-e of a bearing assembly 240b, the output link 202 may have multiple degrees of freedom. In other words, instead of a rigid connection between the linkage system 230 and the output link 202 that would prevent the output link 202 from moving into positions offset from the actuation axis $A_L$ of the linear actuator 220 or out-of-plane from the linear actuator 220, the rotatable connection of the bearing assembly 240 between the linkage system 230 and the output link 202 allows the output link 202 or any other link thereafter connected to the output link 202 (e.g., the lower member $122_L$ of the leg 120) to move into positions offset from the actuation axis $A_L$ of the linear actuator 220 or out-of-plane from the linear actuator 220. Stated differently, when one or both ends 232, 234 of the linkage system 230 are coupled using bearing assemblies 240, 240a-b, the drive system 200 may flexibly adapt to various stresses and/or strains and have a means to transfer some or all of the energy from a detrimental force on the drive system 200 into rotational energy at one or more bearing assembly 240. Although FIG. 2A depicts the drive system 200 with respect to an upper and lower member 122 of the leg 120, these members 122 are shown in dotted lines to indicate that the drive system 200 may be adapted to other locomotive structures of a robot 100 or even other non-robotic applications.

Figure 2B:
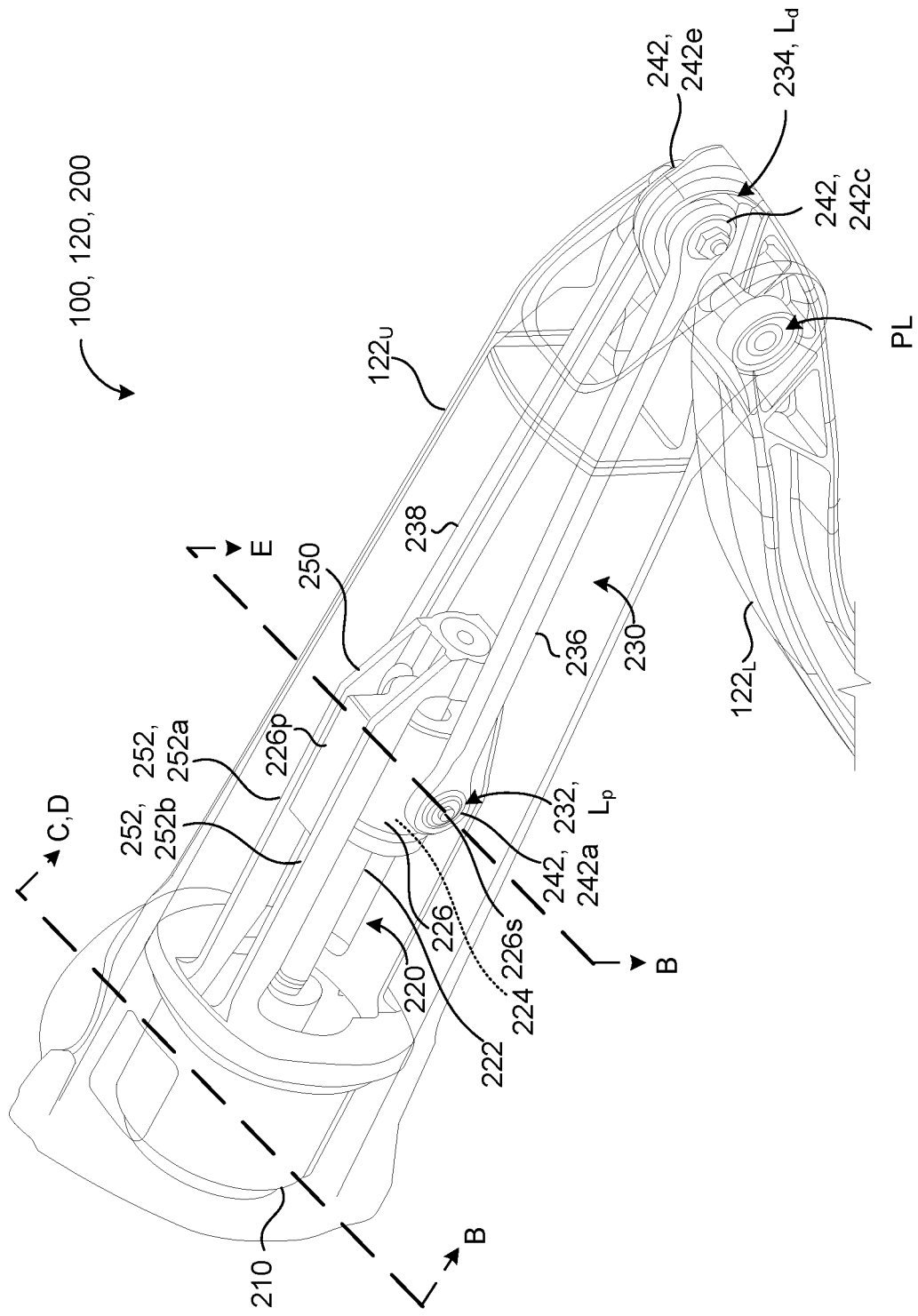
FIG. 2B is a perspective view of an example leg of the robot of FIG. 1 that includes the drive system of FIG. 2A.

In some examples, such as shown in FIGS. 2B-2E, the linear actuator 220 includes a nut 224 (e.g., shown in FIGS. 2B-2E) disposed on the shaft 222 of the actuator 220 that travels along threading of the shaft 222. The nut 224, and an optional housing associated with the nut 224, (e.g., a carrier 226) may extend and/or retract the linkage system 230 that is coupled to the linear actuator 220 (e.g., at the nut 224 or carrier 226). Here, the linkage system 230 travels in reciprocating linear motion within at least a portion of the upper member $122_U$ in order to pivot the lower member $122_L$ relative to the upper member $122_U$ about the pivot point PL. As illustrated in FIG. 2B, the distal end 234 of the linkage system 230 couples to the output link 202 embedded in the lower member $122_L$ at the distal attachment location $L_d$. In this example relative to the view depicted in FIG. 2B, the distal attachment location $L_d$ is at an end of the lower member $122_L$ opposite the distal end 124 (or foot of the leg 120) and above the pivot point PL for the lower member $122_L$ to rotate relative to the upper member $122_U$.

As shown in FIGS. 2B-2E, in some implementations, the linkage system 230 includes at least one connecting rod (e.g., a first connecting rod 236 and a second connecting rod 238). Here, each connecting rod 236, 238 couples to the linear actuator 220 at a mounting shaft 226s (e.g., a cylindrical rod) of the carrier 226 where the shaft $226_S$ of the carrier 226 extends outward (e.g., radially outward relative to the actuation axis $A_L$) from an outer surface of the carrier 226 towards an inner wall of the upper member $122_U$. The carrier 226 generally may serve as an outer shell or housing of the nut 224 that substantially encloses or surrounds the nut 224 while allowing the nut 224 to travel along the shaft 222 of the linear actuator 220. As a housing for the nut 224, the carrier 226 may also include the proximal attachment locations $L_{P1,2}$ where the linkage system 230 connects to the linear actuator 220, such that as the nut 224 moves along the shaft 222, the linkage system 230 moves with the nut 224 in the same direction. Although the shaft $226_S$ extends outward towards the inner wall of the upper member $122_U$, the shaft $226_S$ may terminate at an end of the shaft $226_S$ before contacting the inner wall such that a gap exists between the end of the shaft $226_S$ and the inner wall.

Figure 2C:
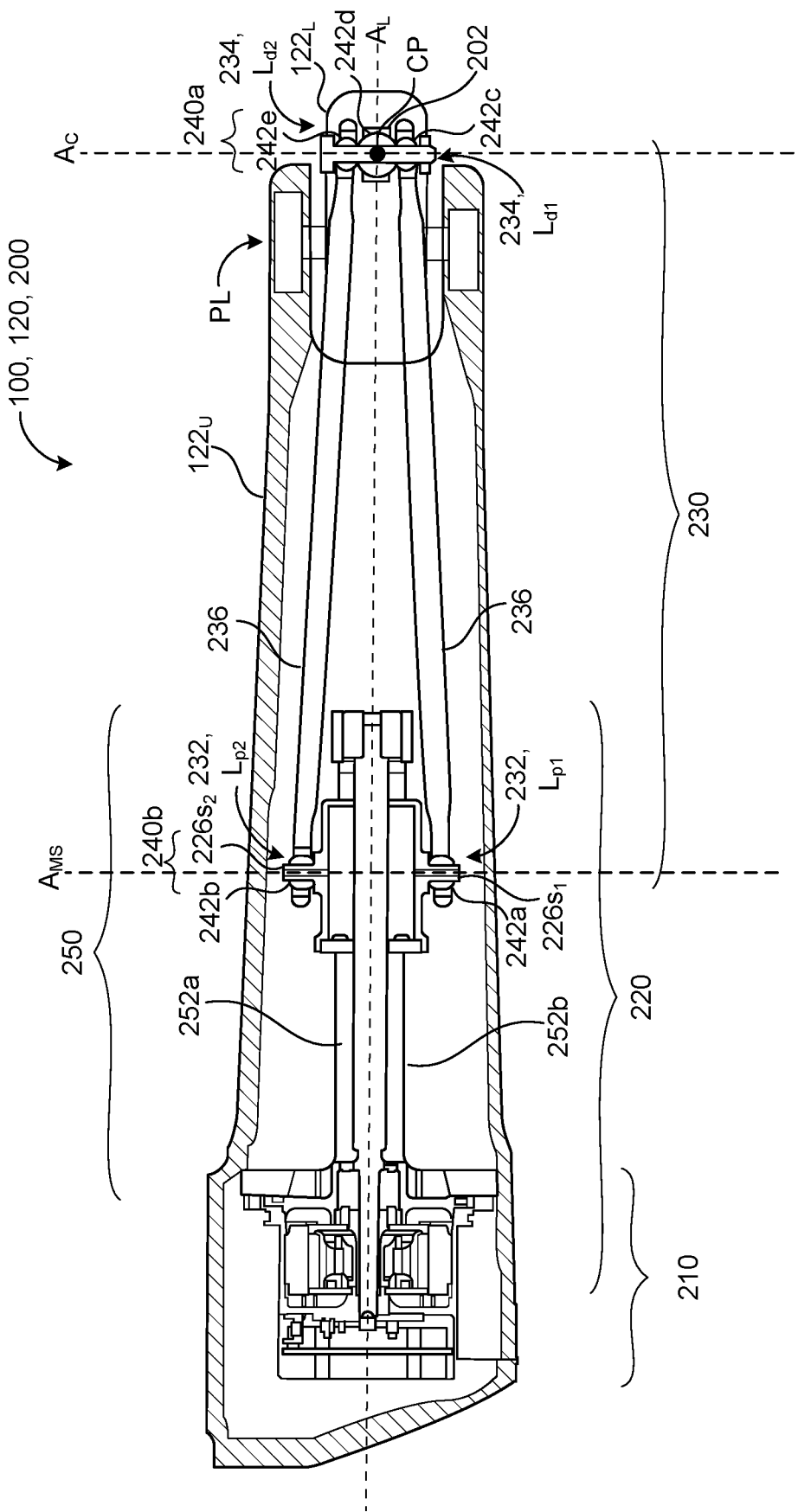
FIG. 2C is a top sectional view of an example upper member of the leg of the robot of FIG. 2B along the cut line B-C.
Figure 2D:
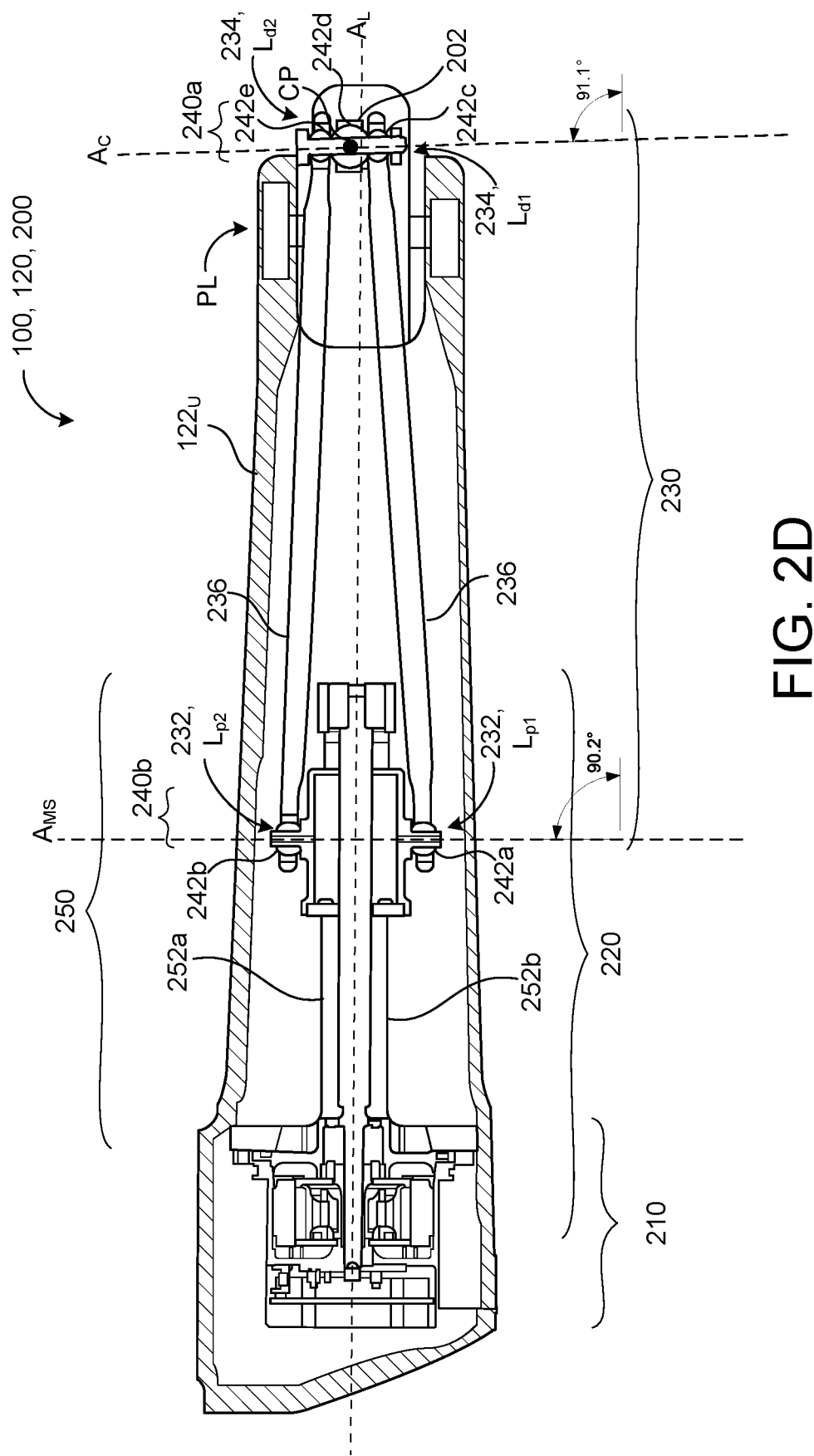
FIG. 2D is a top sectional view of an example upper member of the leg of the robot of FIG. 2B along the cut line B-D when a knee of the robot changes position.

In some examples, when the linkage system 230 includes two connecting rods 236, 238, the carrier 226 includes a corresponding mounting shaft $226_S$ for each of the connecting rods 236, 238 such that the mounting shafts $226_{S1,2}$ are opposite each other and share an axis along their respective lengths (i.e., coaxial). That is each of the mounting shafts $226_{S1,2}$ include a respective longitudinal axis that extend away from the outer surface of the carrier 226 and toward the inner wall of the upper member $122_U$ in in opposite directions orthogonal to the actuation axis, $A_L$. For example, FIGS. 2C and 2D illustrate the coaxial relationship of the mounting shafts $226_{S1,2}$ from a top view with a shared axis $A_{MS}$ coincident with the longitudinal axis of the mounting shafts $226_{S1,2}$ and orthogonal to the actuation axis, $A_L$. The views depicted in FIGS. 2C and 2D also show that each connecting rod 236, 238 of the linkage system 230 may be offset from the actuator axis $A_L$ of the linear actuator 220. For instance, these offsets are equal or, stated differently, the mounting locations $L_P$ of the connecting rods 236, 238 are equidistant from the actuator axis $A_L$. In some configurations, each connecting rod 236, 238 at a proximal end 232 is also offset from the inner wall of the upper member $122_U$. By being offset from the inner wall of the upper member $122_U$, a connecting rod 236, 238 may pivot about the proximal attachment location $L_P$ without risk of interference with the inner wall.

Moreover, since the linkage system 230 may be rotatably coupled to the linear actuator 220 with at least one bearing 242 of a bearing assembly 240, FIGS. 2B-2D show that a spherical bearing 242 may be located at the proximal attachment location $L_P$ and disposed or mounted on the carrier shaft $226_S$ to provide the rotatable coupling. When the linkage system 230 includes two connecting rods 236, 238, each attached to a coaxial carrier mounting shaft $226_{S1,2}$, a respective spherical bearing 242a, 242b may form the coupling between each connecting rod 236, 238 and each mounting shaft 226s. In some examples, each spherical bearing 242 mounted on the mounting shaft $226_S$ includes a central point of rotation where these central points are collinear and included as points along the mounting shaft axis $A_{MS}$. In other words, the mounting axis $A_{MS}$ intersects the actuator axis $A_L$. For instance, the mounting axis $A_{MS}$ is orthogonal to the actuator axis $A_L$. In some configurations, the mounting axis $A_{MS}$ also includes (or is aligned with) a center point of the nut 224. In some examples, the first and second spherical bearings 242a-b are mounted concentrically to one another.

Referring further to the linkage system 230, when the linkage system 230 includes two connecting rods 236, 238, an axis of the connecting rods 236, 238 may converge toward and/or at the output link 202. In other words, the distal ends 234 of the connecting rods 236, 238 may be configured such that the distal ends 234 basically share the same distal attachment location $L_D$. For example, FIGS. 2B-2D illustrate a bearing assembly 240 at the distal ends 234 of the connecting rods 236, 238 that includes three spherical bearings 242, 242c-e. In some implementations, these three spherical bearings 242 are concentric such that their central points of rotation share a common axis $A_C$. This concentric common axis $A_C$ may be orthogonal to the actuation axis $A_L$ and parallel to the mounting axis $A_{MS}$. In this arrangement, the first connecting rod 236 includes a first distal spherical bearing 242c at its distal end 234 (e.g., a first distal end) to rotatably couple the first connecting rod 236 to the output link 202 (e.g., a portion of the lower member $122_L$). The output link 202 includes a third spherical bearing 242d (e.g., also referred to as an output spherical bearing) and the second connecting rod 238 includes a second distal spherical bearing 242e at its distal end 234 (e.g., a second distal end) to rotatably couple the second connecting rod 238 to the output link 202. Here, the first distal spherical bearing 242c, associated with a first distal attachment location, and the second distal spherical bearing 242e, associated with a second distal attachment location, are disposed on opposite sides of the actuation axis $A_L$ and equidistantly offset from the actuation axis $A_L$. In some examples, the magnitude of offset between each of the first and second distal spherical bearings 242c, 242e and the actuation axis $A_L$ is less than the magnitude of offset between each of the first and second proximal spherical bearings 242a, 242b and the actuation axis $A_L$.

In some examples, as shown in FIGS. 2C and 2D, the set of bearings 242c-e connect by a pin along their concentric axis $A_C$. With each bearing 242 sharing the concentric axis $A_C$, FIGS. 2C and 2D illustrate that the knee joint $J_K$ of the leg 120 may move to a position offset from the actuation axis $A_L$ of the linear actuator 220 or out-of-plane of the linear actuator 220 and the couplings of the drive system 200 handle the stress and strain generated by such a move. In other words, when the lower member $122_L$ or knee joint $J_K$ undergoes a particular stress (e.g., from an external force), the drive system 200 enables flexibility to reduce or to prevent such stress. For instance, the external structure of the leg 120 (e.g., the lower member $122_L$ and/or the upper member $122_U$) flexes to reduce stress on the linear actuator 220.

When the knee joint $J_K$ of the leg 120 moves to a position offset from the actuation axis $A_L$ of the linear actuator 220 or out-of-plane of the linear actuator 220, the concentric axis $A_C$ of the bearing assembly 240a at the distal end 234 of the linkage system 230 may shift out of parallel with the mounting axis $A_{MS}$ for the bearing assembly 240b at the proximal end 232 of the linkage system 230. For example, FIG. 2D depicts the mounting axis $A_{MS}$ for the bearing assembly 240b at about a 90 degree angle with the actuation axis $A_L$ while the concentric axis $A_C$ of the bearing assembly 240a at the distal end 234 of the linkage system 230 is at an angle of about 91.1 degrees with the actuation axis $A_L$. Therefore, the bearing assemblies 240a-b may even allow the drive system 200 to be fluid and/or non-rigid with respect to each other (i.e., do not necessarily have to maintain a parallel relationship). Additionally or alternatively, the spherical bearing 242d of the output link 202 that is part of the bearing assembly 240a between the spherical bearings 242c, 242e of the linkage system 230 is configured to allow the lower member $122_L$ to rotate about the spherical bearing 242d on whatever axis operation of the leg 120 demands.

In some configurations, the drive system 200 additionally include a linear constraint 250 for the nut 224 and/or carrier 226. For example, FIGS. 2B-2E depict the linear constraint as a frame 250 extending between the motor assembly 210 at an end of the motor assembly 210 nearest the linear actuator 220 and an end of the linear actuator 220 opposite the motor assembly 210. In some examples, the frame 250 functions to provide some rigidity around the linear actuator 220 while also constraining particular movement of the nut 224 and/or carrier 226. Yet in other examples, the frame 250 is merely a constraint mechanism. In either case, the frame 250 functions as a constraint mechanism by preventing rotation of the nut 224 about the actuation axis $A_L$. By preventing rotation of the nut 224 about the actuation axis $A_L$, a constraint mechanism ensures that the nut 224 travels along the shaft 222 of the actuator 220 without deviation or a loss of energy transfer.

In some implementations, the frame 250 prevents rotation of the nut 224 by constraining rotation of the carrier 226 housing the nut 224. For example, the frame 250 includes guide rails 252 extending along a length of the frame 250. Here, the guide rails 252 are parallel to the actuator axis $A_L$ yet offset from this axis $A_L$. With guide rails 252, 252a-b, the carrier 226 may be constructed with a protrusion 226p or fin that extends between the guide rails 252. For instance, the protrusion 226p contacts or touches a face of a first guide rail 252a that is opposite a face of a second guide rail 252b that the protrusion 226p also contacts. In this configuration, each of these faces interfere with the carrier 226 rotating clockwise or counterclockwise. Although this frame approach is the only form of linear constraint for the nut 224 shown in the figures, this linear constraint 250 may also be accomplished with rollers or another shaft that is parallel to the shaft 222 of the linear actuator 220 and cylindrical bushing. A frame 250 may be advantageous to a design of the drive system 200 within an upper member $122_U$ of a leg 120 of a robot 100 because the frame 250 aims to use minimal materials while functioning as a constraint mechanism as compared to other designs such as a solid cylinder as the constraint mechanism.

Figure 2E:
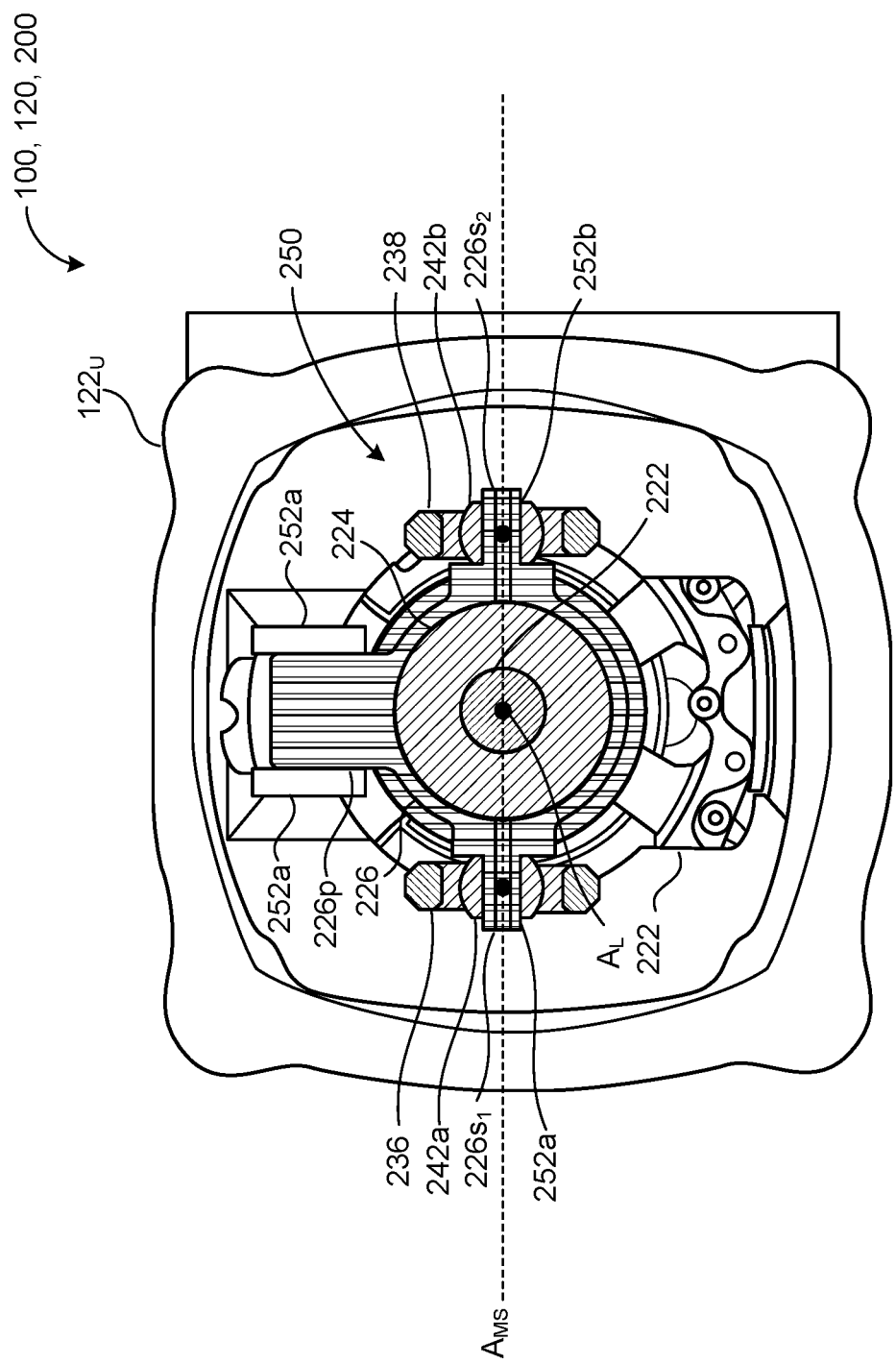
FIG. 2E is a front sectional view of an example of the upper member of the leg of the robot of FIG. 2B along the cut line B-E.

FIG. 2E is an example of a cross section of the leg 120 of FIG. 2B along the cut line B-E. This view illustrates that the linear actuator 220 and the proximal end 232 of the linkage system 230 are offset from the inner wall of the upper member 122u. This offset may allow the knee joint $J_K$ and/or the lower member $122_L$ to receive external forces and dissipate or reduce these forces through the flexible motion of the outer frame (e.g., the upper member $122_U$ and/or lower member $122_L$) around the drive system 200. Additionally, this view depicts the protrusion 226p of the carrier 226 between the guide rails 252, 252a—b such that inside faces of these guide rails 252 contact the protrusion 226p. Moreover, this cutaway shows the relationship between the central points of the bearings 242a—b, the mounting shaft axis $A_{MS}$, and the actuator axis $A_L$. In other words, in some configurations, such as FIG. 2E, the central points of the bearings 242a—b are collinear and included as points along the mounting shaft axis $A_{MS}$ while the mounting axis $A_{MS}$ intersects the actuator axis $A_L$ (e.g., orthogonally intersects the actuator axis $A_L$). Additionally or alternatively, the mounting axis $A_{MS}$ also includes (or is aligned with) a center point of the nut 224. Furthermore, as discussed previously, this view also illustrates that the spherical bearings 242a—b of the bearing assembly 240 at the proximal end 232 of the linkage system are equidistantly offset from the actuation axis $A_L$ and/or a center point of the nut 224.

Figure 3:
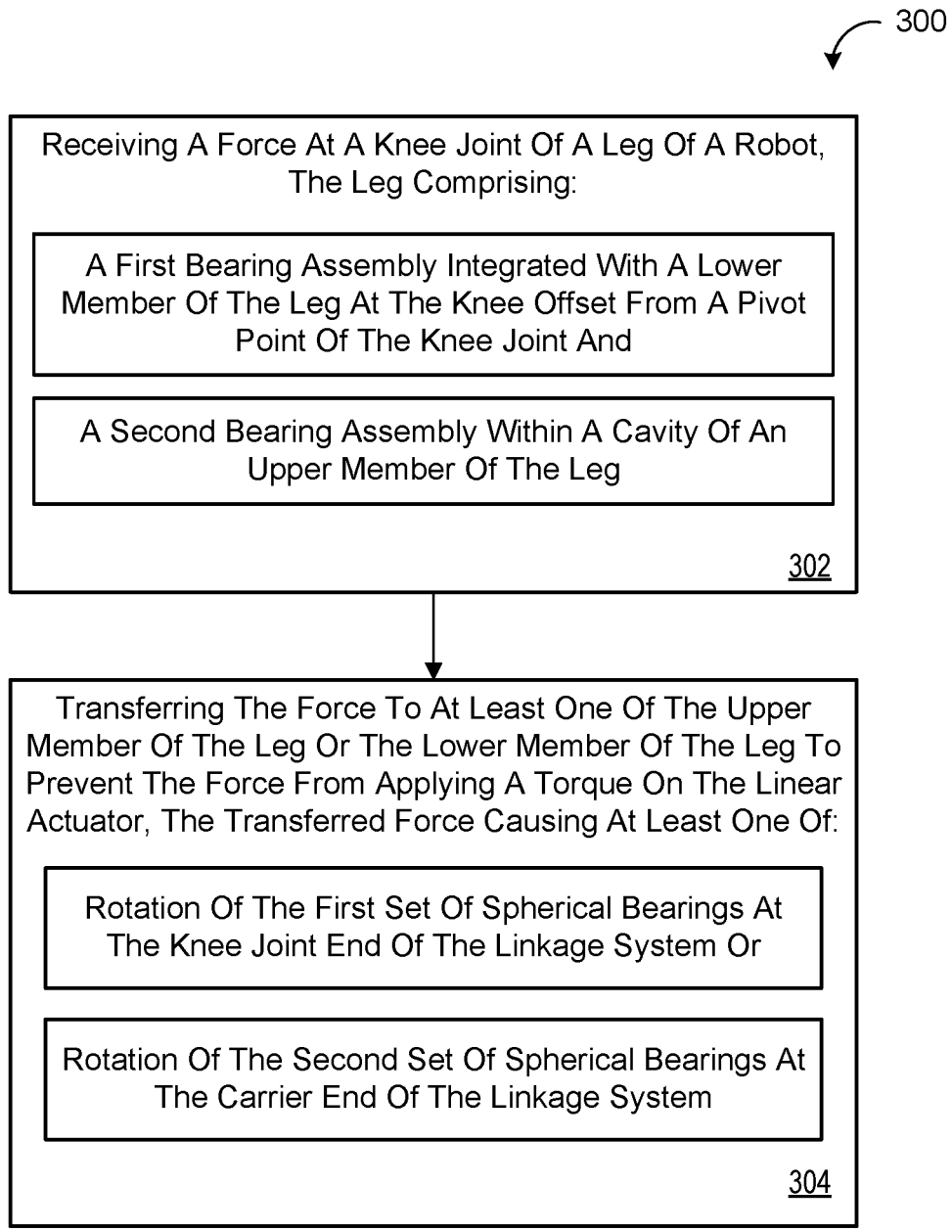
FIG. 3 is an example arrangement of operations for a robot to reduce forces in a drive system of the robot.

FIG. 3 illustrates an example method 300 of transferring force away from particular components (e.g., the linear actuator 220) of a drive system 200. At operation 302, the method 300 receives a force at a knee joint $J_K$ of a leg 120 of a robot 100. The leg 120 of the robot 100 includes a first bearing assembly 240a and a second bearing assembly 240b. The first bearing assembly 240a is integrated with a lower member 120L of the leg 120 at the knee joint $J_K$ offset from a pivot point PL of the knee joint $J_K$. The first bearing assembly 240a includes a first set of spherical bearings 242. The second bearing assembly 240b is within a cavity of the upper member $120_U$ of the leg 120 and is rotatably coupled to the first bearing assembly 240a by a linkage system 230. The second bearing assembly 240b is rotatably coupled to a carrier 226 by the linkage system 230 at a carrier end 232 (e.g., proximal end) of the linkage system 230 opposite a knee joint end 234 of the linkage system 230. The carrier 226 is disposed on a linear actuator 220 housed within the upper member $120_U$. The second bearing assembly 240b includes a second set of spherical bearings 242. The carrier 226 is configured to translate motion of the linear actuator 220 to the linkage system 230 causing the lower member $122_L$ of the leg 120 to pivot about the pivot point PL of the knee joint $J_K$. At operation 304, the method 300 transfers the force to at least one of the lower member $122_L$ of the leg 120 or the upper member $122_U$ of the leg 120 to reduce the force from applying a torque on the linear actuator 220. Here, the transferred force causes at least one of rotation of the first set of spherical bearings 242 at the knee joint end 234 (e.g., distal end) of the linkage system 230 or rotation of the second set of spherical bearings 242 at the carrier end 232 of the linkage system 230.

Figure 4:
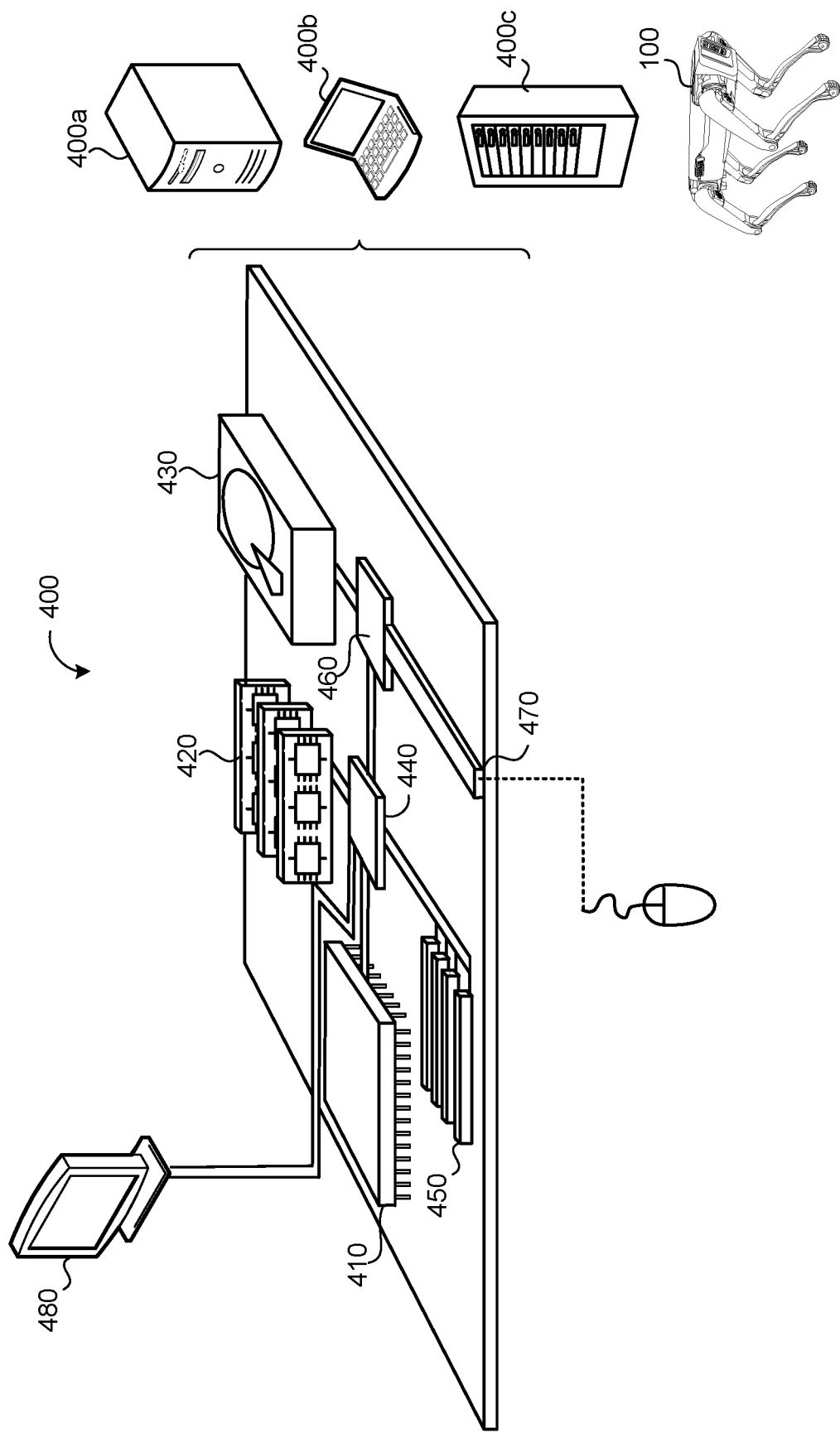
FIG. 4 is a schematic view of an example computing device that may be used to implement the systems and methods described herein.

FIG. 4 is schematic view of an example computing device 400 that may be used to implement the systems (e.g., the drive system 200) and methods (e.g., the method 300) described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410 (e.g., data processing hardware), memory 420 (e.g., memory hardware), a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, or as part of a rack server system 400c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A drive system comprising:
a linear actuator comprising a drive shaft and having an actuation axis extending along a length of the linear actuator;
a motor assembly coupled to the drive shaft of the linear actuator and configured to rotate the drive shaft about the actuation axis of the linear actuator;
a nut attached to the drive shaft;
a carrier housing the nut;
a linkage system extending from a proximal end away from the motor assembly to a distal end, the proximal end rotatably attached to the carrier at a first proximal attachment location, the first proximal attachment location offset from the actuation axis; and
an output link rotatably coupled to a first distal attachment location on the distal end of the linkage system, the output link offset from the actuation axis, wherein a line bisecting the first proximal attachment location and the first distal attachment location converges toward the actuation axis in a direction extending from the first proximal attachment location to the first distal attachment location.

2. The drive system of claim 1, wherein the linkage system comprises:
a proximal spherical bearing disposed at the proximal end of the linkage system and defining a first axis of rotation orthogonal to the actuation axis, the proximal spherical bearing rotatably attaching the linkage system to the carrier at the first proximal attachment location; and
a distal spherical bearing disposed at the distal end of the linkage system and defining a second axis of rotation orthogonal to the actuation axis, the distal spherical bearing rotatably coupling the output link to the distal end of the linkage system at a first distal attachment location, the first distal attachment location offset from the actuation axis.

3. The drive system of claim 2, wherein, in a first position of the drive system, the first axis of rotation and the second axis of rotation are parallel to one another and, in a second position of the drive system, the first axis of rotation and the second axis of rotation are non-parallel to one another.

4. The drive system of claim 1, further comprising a frame disposed on the motor assembly, the frame at least partially surrounding the carrier and extending from the motor assembly to an end of the drive shaft.

5. The drive system of claim 4, wherein the frame comprises at least one guide rail extending along a length of the frame, the at least one guide rail guiding the carrier along the actuation axis of the drive shaft and constraining rotation of the carrier about the actuation axis.

6. The drive system of claim 4, wherein the frame comprises a first guide rail and a second guide rail, the first guide rail and the second guide rail extending along a length of the frame and comprising opposing faces, and wherein the carrier comprises a protrusion seated between the opposing faces of the first guide rail and the second guide rail.

7. A drive system comprising:
a linear actuator comprising a drive shaft and having an actuation axis extending along a length of the linear actuator;
a motor assembly coupled to the drive shaft of the linear actuator and configured to rotate the drive shaft about the actuation axis of the linear actuator;
a nut attached to the drive shaft;
a carrier housing the nut;
a linkage system extending from a proximal end away from the motor assembly to a distal end, the proximal end rotatably attached to the carrier at a first proximal attachment location, the first proximal attachment location offset from the actuation axis; and
an output link rotatably coupled to a first distal attachment location on the distal end of the linkage system, the output link offset from the actuation axis,
wherein the linkage system further comprises:
a first connecting rod having a first proximal end disposed at the proximal end of the linkage system and a first distal end disposed at the distal end of the linkage system, the first proximal end rotatably attached to the carrier at the first proximal attachment location; and
a second connecting rod having a second proximal end disposed at the proximal end of the linkage system and a second distal end disposed at the distal end of the linkage system, the second proximal end rotatably attached to the carrier at a second proximal attachment location, the second attachment location offset from the actuation axis.

8. The drive system of claim 7, wherein a line bisecting the first proximal attachment location and the first distal attachment location converges toward the actuation axis in a direction extending from the first proximal attachment location to the first distal attachment location.

9. The drive system of claim 7, wherein the first proximal attachment location and the second proximal attachment location are disposed on opposite sides of the actuation axis and equidistantly offset from the actuation axis.

10. The drive system of claim 7, wherein the linkage system further comprises:
a first proximal spherical bearing disposed at the first proximal end of the first connecting rod and defining a first axis of rotation orthogonal to the actuation axis, the first proximal spherical bearing rotatably attaching the first connecting rod to the carrier at the first proximal attachment location; and
a second proximal spherical bearing disposed at the second proximal end of the second connecting rod and defining a second axis of rotation orthogonal to the actuation axis and coaxial with the first axis of rotation, the second proximal spherical bearing rotatably attaching the second connecting rod to the carrier at the second proximal attachment location.

11. The drive system of claim 7, wherein the linkage system further comprises:
a first distal spherical bearing disposed at the first distal end of the first connecting rod and defining a first axis of rotation orthogonal to the actuation axis, the first distal spherical bearing rotatably coupling the output link to the first distal end of the first connecting rod at a first distal attachment location, the first distal attachment location offset from the actuation axis; and
a second distal spherical bearing disposed at the second distal end of the second connecting rod and defining a second axis of rotation orthogonal to the actuation axis and coaxial with the second axis of rotation, the second distal spherical bearing rotatably coupling the output link to the second distal end of the second connecting rod at a second distal attachment location, the second distal attachment location offset from the actuation axis.

12. The drive system of claim 11, wherein the first distal attachment location and the second distal attachment location are disposed on opposite sides of the actuation axis and equidistantly offset from the actuation axis.

13. The drive system of claim 11, wherein the output link comprises an output spherical bearing disposed between the first spherical bearing and the second distal spherical bearing and defining a third axis of rotation coaxial with the first axis of rotation and the second axis of rotation.

14. The drive system of claim 7, wherein:
the first connecting rod defines a longitudinal axis that converges toward the actuation axis in a direction extending from the first proximal end of the first connecting rod to the first distal end of the first connecting rod; and
the second connecting rod defines a longitudinal axis that converges toward the actuation axis in a direction extending from the second proximal end of the second connecting rod to the second distal end of the second connecting rod.

15. The drive system of claim 7, wherein the carrier comprises:

a first mounting shaft extending away from an outer surface of the carrier in a first direction, the first mounting shaft defining the first proximal attachment location; and a second mounting shaft extending away from the outer surface of the carrier in a second direction opposite the first direction, the second mounting shaft defining the second proximal attachment location.

16. The drive system of claim 15, wherein a longitudinal axis of the first mounting shaft and a longitudinal axis of the second mounting shaft are coincident with one another and orthogonal to the actuation axis.

17. A robot comprising:

a leg comprising an upper member and a lower member, the upper member coupled to the lower member at a pivot point of a knee joint of the leg; and a drive system configured to rotate the lower member of the leg about the pivot point of the knee joint, the drive system within a cavity of the upper member, the drive system comprising:
  a motor assembly;
  a linear actuator coupled to the motor assembly and extending along an axis of the upper member;
  a carrier disposed on the linear actuator; and
  a linkage system comprising at least one connecting rod, the at least one connecting rod having a first end and a second end, the first end connecting to the carrier with a first spherical bearing, the second end connecting to the lower member at a position offset from the pivot point of the knee joint with a second spherical bearing, the second spherical bearing of the at least one connecting rods coaxially joined to a third spherical bearing embedded into the lower member at the knee joint,
  wherein the carrier is configured to translate motion of the linear actuator to the linkage system causing the lower member of the leg to pivot about the pivot point of the knee joint.

18. The robot of claim 17, wherein the carrier further comprises a first cylinder rod and a second cylinder rod, the first cylinder rod and the second cylinder rod extending toward an inner wall of the upper member, the first cylinder rod and the second cylinder rod coaxial along an axis that intersects the axis of the upper member.

19. The robot of claim 17, wherein the drive system further comprises a frame extending along the axis of the upper member, the frame at least partially enclosing the linear actuator and the carrier.

20. The robot of claim 19, wherein the frame constrains the carrier to translate along the axis of the upper member.

21. The robot of claim 19, wherein the frame constrains the carrier from rotating about the axis and guides the carrier to translate along the axis of the upper member.

22. The robot of claim 20, wherein the carrier comprises a protrusion constrained by portions of the frame.

23. The robot of claim 19, wherein the frame is offset from inner walls of the upper member.

24. The robot of claim 17, wherein the carrier encloses a nut configured to translate along a screw shaft of the linear actuator.

\* \* \* \* \*